May 19, 1953  J. KINZELMAN ET AL  2,639,049
DOUGHNUT HANDLING APPARATUS
Filed Oct. 28, 1949  3 Sheets-Sheet 1
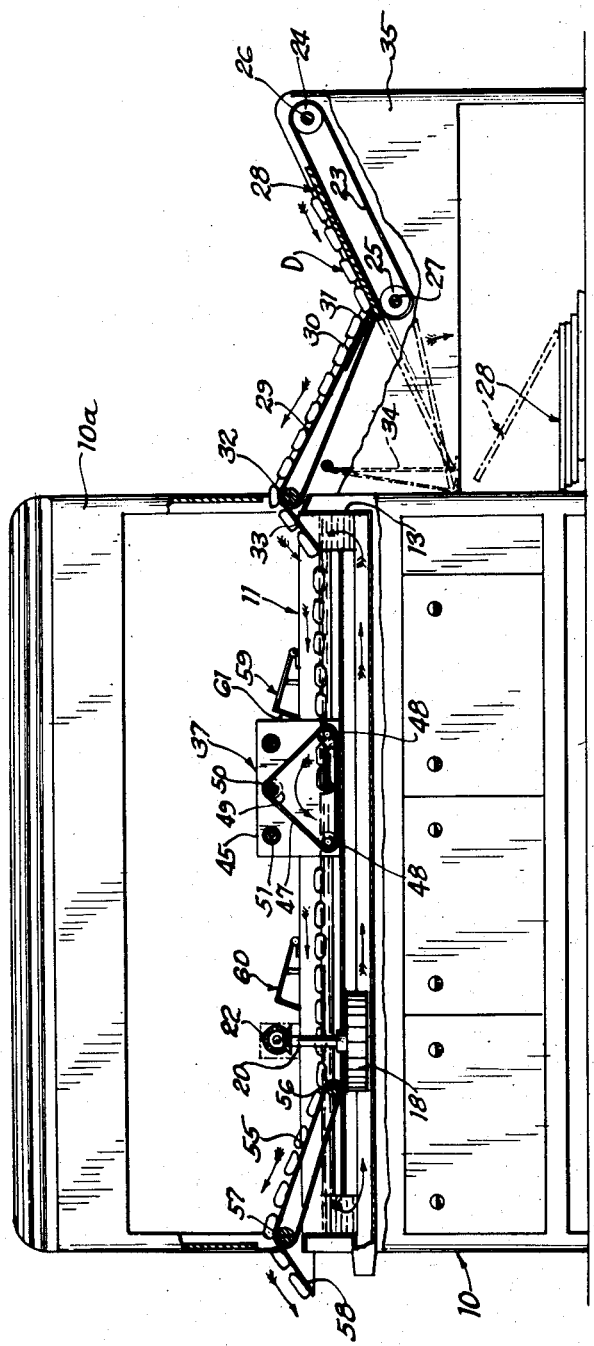
INVENTORS.
Joseph Kinzelman
Frank A. Anetsberger
BY
Sheridan, Davis & Cargill
Attys

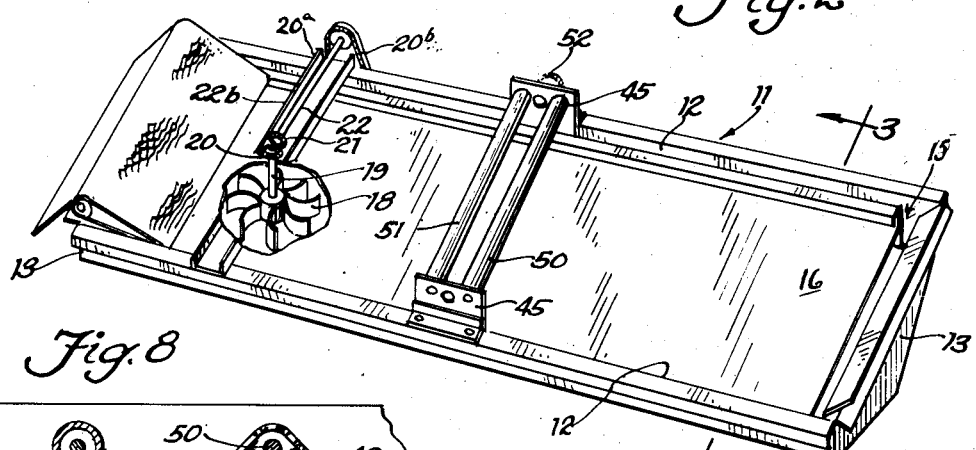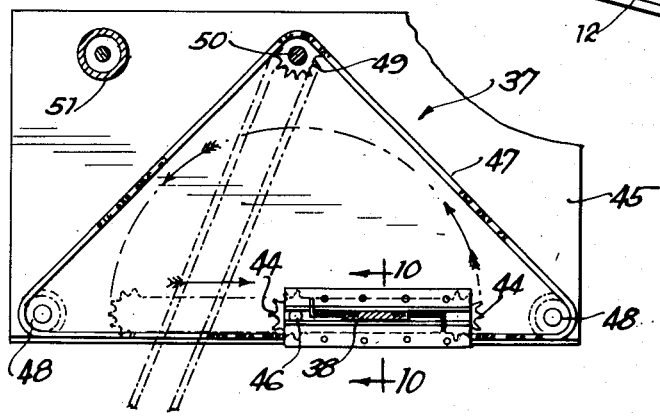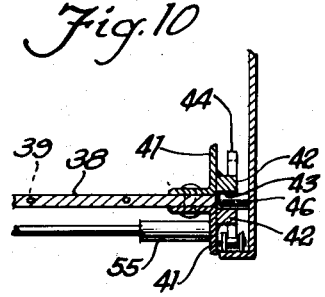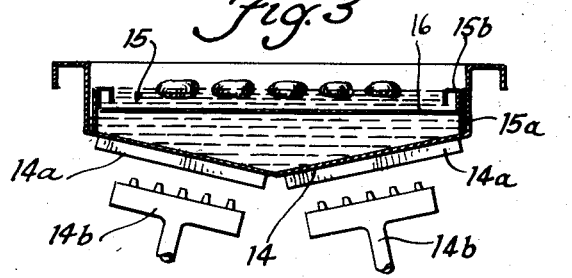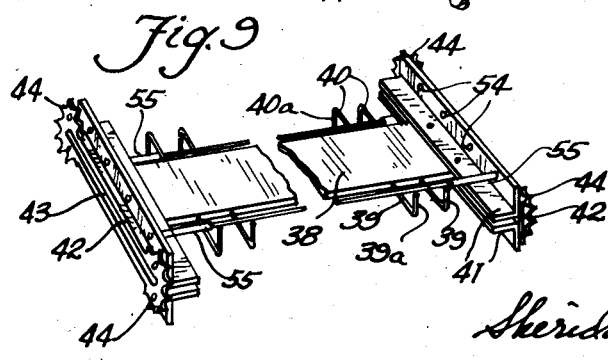

May 19, 1953  J. KINZELMAN ET AL  2,639,049
DOUGHNUT HANDLING APPARATUS
Filed Oct. 28, 1949  3 Sheets—Sheet 3
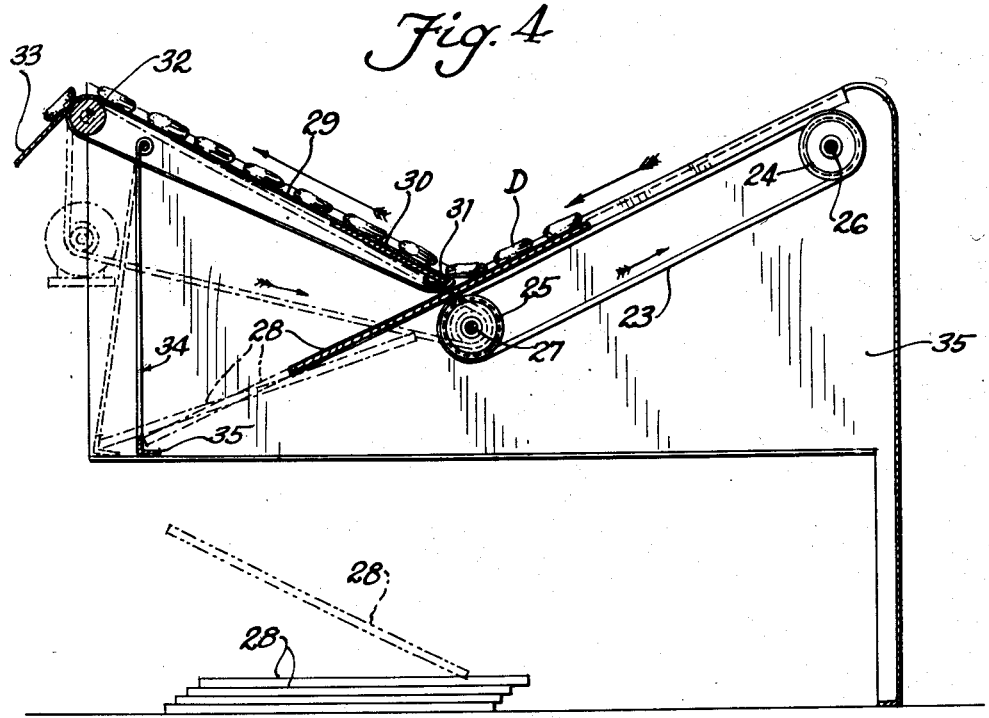
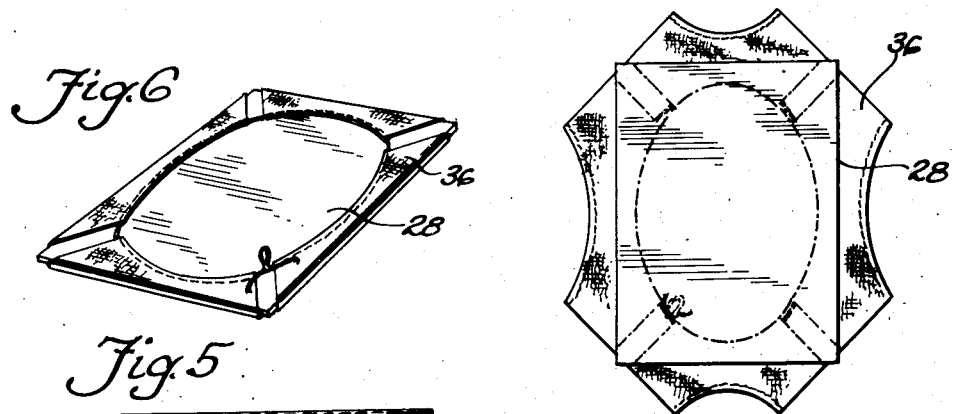
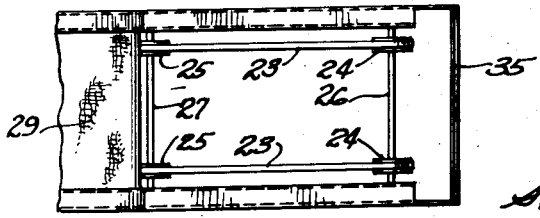
INVENTORS
Joseph Kinzelman
Frank A. Aneisberger
BY
Sheridan, Davis & Cargill
Attys Patented May 19, 1953

2,639,049

UNITED STATES PATENT OFFICE 2,639,049

DOUGHNUT HANDLING APPARATUS

Joseph Kinzelman, Northbrook, and Frank A. Anetsberger, Chicago, Ill., assignors to Anetsberger Bros., Inc., Northbrook, Ill., a corporation of Illinois Application October 28, 1949, Serial No. 124,171

1 Claim. (Cl. 214—310)

This invention relates to improvements in doughnut cooking apparatus.

One object of the invention is to provide improved apparatus for cooking doughnuts by a continuous process including mechanism for handling doughnuts in dough form on trays, removing them from the trays and transferring them into the hot fat, turning the doughnuts as they progress along the vat containing the fat and then removing the cooked doughnuts from the vat.

Another more specific object of the invention is to provide an improved transferring mechanism for removing uncooked doughnuts from trays on which they may be placed in the machine for transferring the doughnuts from the trays to the apparatus for cooking.

An additional object of the invention is to provide an improved doughnut turning or inverting device which automatically turns doughnuts over after having been cooked on one side for the purpose of cooking them on the other side.

An additional object of the invention is to provide a doughnut cooking apparatus provided with means for causing a flow of the surface cooking fat from one end of a containing vat to the other for the purpose of causing the doughnuts to progress from the receiving to the outlet end of the apparatus during the cooking process.

Other objects of the invention will be apparent from the consideration of the following specification and accompanying drawings, wherein:

Figure 1 is a broken side elevational view of apparatus embodying the present improvements, Fig. 2 is a broken perspective view of a fat holding vat (parts being omitted) which forms a portion of the apparatus shown in Fig. 1, Fig. 3 is a sectional view taken on line 3—3 of Fig. 2, Fig. 4 is an enlarged broken longitudinal sectional view of means for handling doughnut trays one at a time and transferring the doughnuts from the trays to the cooking vat, Fig. 5 is a broken top plane view of the portion of the mechanism shown in Fig. 4, Fig. 6 is a perspective view of the bottom of one of the trays showing a removable and washable fabric cover in position on the tray, Fig. 7 is a plane view of a tray cover illustrating a tray thereon preparatory to folding the cover into position for securement to the tray, Fig. 8 is an enlarged end view of the improved doughnut tilting or turn-over or inverting mechanism, Fig. 9 is a broken perspective view of the carriage portion of the turn-over mechanism, Fig. 10 is a broken sectional view taken on line 10—10 of Fig. 8.

In Fig. 1 of the drawing the apparatus is shown as comprising a suitable support 10 for a cooking vat indicated generally by the numeral 11. Over the vat is a hood 10$^a$, one purpose of which is to prevent foreign matter from settling into the vat. The vat 11 is shown in detached relation in Fig. 2 and as will be seen comprises an elongated vessel having side walls 12, end walls 13 and a bottom comprising, preferably, two inclined portions 14. Within the vat is a sheet metal fabricated tunnel forming member 15 comprising a horizontal imperforate top 16 provided with depending side walls 15$^a$ and upstanding guides 15$^b$ extending longitudinally of the member 15. The side walls 15$^a$ rest upon the bottom of the vat and locate the member 15 at a proper level beneath the normal surface of the grease. The member 15, in cooperation with the bottom of the vat, provides a circulation tunnel 17. At one end of the tunnel there is located an impeller of any suitable construction indicated by the numeral 18. The impeller shown is provided with a drive shaft 19 carrying a gear 20 adjacent its upper end adapted to be driven by gear 21 on a shaft 22 located within a guard 20$^a$ and extending horizontally over the upper edge of a side wall 12. The shaft 22 may be driven by any suitable mechanism such as a chain 20$^b$, from a power source located in the cabinet-like lower portion of support 10. The action of the impeller causes the oil or fat in the vat (which is at a level above the top of tunnel member 16 adequate for floating the doughnuts) to flow from left to right through the tunnel, whence it emerges and flows to the left-hand end of the vat into the intake end of the tunnel. The circulation of the surface portion of the body of oil in the vat is therefore from right to left as viewed in Figs. 1 and 2.

At the right-hand end of the machine, as viewed in Fig. 1, a doughnut feeding apparatus is disclosed which is adapted to handle successive trays of raw or uncooked doughnuts, thereby obviating the necessity of removing the doughnuts from the trays by hand and placing them in the cooking vat. In the structure shown in Figs. 1, 4 and 5, the doughnut feeding apparatus comprises a pair of parallel V belts 23 supported in inclined relation as shown by upper and lower pulleys 24 and 25, respectively, which are mounted on transverse shafts 26 and 27. A tray indicated generally by numeral 28 is shown in position in Fig. 1, that is, it rests upon the belts 23 which move in a direction to carry the tray downwardly along the inclined path defined by the upper runs of the parallel belts 23. Adjacent the lower end of the tray 28, as viewed in Fig. 1, is located the lower end of a doughnut pick-up conveyor 29 which comprises preferably a fabric, such as a canvas belt, which passes around a relatively acute sheet metal support 30 at the lower end 31 of the latter and over a driving roll 32 which is at an elevation slightly above the upper edge of the adjacent end wall 13 of the vat. The conveyor 29 where it passes around the lower end 31 of the member 30 forms an acute angle the apex of which is closely adjacent the upper plane of the tray 28 and as the doughnuts on the tray contact the conveyor 29, which moves in the direction of the arrow, they are transferred from the downwardly moving tray and are carried upwardly and to the left by the conveyor and discharged over the inclined lip 33 into the vat as indicated in Fig. 1. As a tray 28 moves downwardly and to the left as viewed in Fig. 4, it is retained from tilting from the upper plane of the belts by any suitable means, such as a swinging support 34 which extends between the side walls of the supporting structure 35 of the apparatus.

When the doughnuts have been removed from a tray by reason of the progress of the tray downwardly along the plane of the upper run of the belts 23, the tray is released and drops to the floor, as shown in Figs. 1 and 4. The deposited trays, in stacked relation, may be readily removed from time to time as will be obvious.

The trays above referred to and indicated generally by numeral 28, are preferably made of plywood covered on the upper surface by a removable fabric cover 36 which for convenience may be in the form illustrated in Fig. 7. A draw string is provided for securing the cover to the tray as shown in Fig. 6. The covers may be formed of canvas and due to the construction shown they can readily be placed in position on the trays and can likewise readily be removed for laundering purposes.

The trays with the covers thereon are adapted for use by bakers in their proof boxes. That is, after the doughnuts have been formed, they are placed upon the trays and placed in the proof boxes for proofing where the dough is of the character requiring proofing. When the doughnuts are to be cooked the machine is started and the trays are placed upon the belts 23 in succession, which, as above described, moves the trays downwardly and to the left at a proper rate during which the conveyor 29 removes the doughnuts from the tray and transfers them to the hot cooking fat within the vat 11.

The bottom of the vat, preferably its lower inclined portions 14 are provided with a plurality of heat absorbing fins 14ª, the heat being supplied by a plurality of burners 14ᵇ as indicated in Fig. 3.

As the raw doughnuts are delivered into the hot fat in the vat, they tend to move from right to left as viewed in Fig. 1, due to the direction of the flow imparted to the oil by the impeller as above described.

As the doughnuts are fed into the vat and move to the left as viewed in Fig. 1, the advancing doughnuts will come within the range of a doughnut turn-over or inverting device indicated generally by the numeral 37. This device is shown in section in Fig. 1 and shown in detached relation in Fig. 9. The device 37 comprises a pick-up tray which may be of wire mesh if desired, but which is shown in Fig. 9 as comprising a transverse sheet metal section provided with two rows of arms 39 and 40 at opposite longitudinal edges of the tray. These arms 39 and 40 are preferably made of heavy gauge wire or rod material and have the outer ends offset in vertical planes to avoid impaling doughnuts thereon. The ends 39ª of the row 39, shown in Fig. 9, extend upwardly while the ends of 40ª of the row of arms 40 extend downwardly. When the mechanism shown in Fig. 9 has been inverted about a horizontal axis the ends of the respective rows will of course extend in the opposite directions.

The tray portion 38 in the form of the device shown in Fig. 9 is secured at its ends to heads composing angle members 41 which at the outer faces are provided with guide members 42. The guide members are longitudinally slotted at 43 and at the ends are provided with partial sprocket members 44, the ends of the slots being coaxially located with respect to the adjacent sprockets. The turn-over device shown in Fig. 9 is mounted transversely of the vat between adjacent vertical plates 45 which are shown in Figs. 1 and 2 as being attached to the vertical walls 12 of the vat 11 approximately midway between the ends of the latter. When the tray 38 is in the horizontal position it is submerged in the fat at a level sufficient to enable doughnuts to float over the tray in position to be picked up and inverted as the tray is swung as later described.

Extending inwardly of the vat from each plate 45 is a cylindrical stud 46 which extends into the adjacent slot 43 of one of the guide members 42. At each end of the turn-over device, a sprocket chain 47 extends around two sprockets 48 located at a common plane beneath the level of the fat and journaled in a plate 45. Each chain also passes over an upper sprocket 49 which is mounted on a driven shaft 50 which is journaled in the plates 45. For the purpose of rigidity two spacing tubes 51, one on each side of the driven shaft 50, are shown in the drawing. The shaft 50 may be driven by any suitable means such as by a sprocket 52 located adjacent the outer surface of one of the supporting plates 45 which is driven by any suitable power source or power take-off means located in the cabinet-like lower portion of the support. The lower run of the chain 47 is located beneath the level of the oil and is adapted to be engaged by the partial sprocket 44 of the turn-over mechanism 37. It will be seen that by reason of the movement of the shaft 50 in a counterclockwise direction as viewed in Fig. 1 the lower run of the chain 47 will move from left to right and inasmuch as the partial sprockets 44 of each end of the turn-over device are in mesh with the horizontal run of the chain 47, the tray 38 of the turn-over device will be moved bodily in a horizontal plane from left to right beneath the surface of the cooking fat. When, however, the left-hand ends of the slots or channels 43 engage the respective stationary studs 46, the sprockets 44 at the left-hand end will be rotated by the movement of the horizontal run of the chain and swing the turn-over device bodily about the axis of the studs 46 as indicated by the arrows in Fig. 8. Doughnuts which had previously floated over the turn-over device will thus be picked up and deposited in the vat at the left-hand side of the turn-over device, with their previously uncooked portions in the lowermost positions. After the turn-over tray has been swung from the full line position in Fig. 8 to the dotted line position it will again move horizontally from left to right by reason of the engagement of all sprockets 44 with the horizontal runs of the chains and thus move from the dotted line position to the full line position when the tray will again be inverted and will again carry doughnuts from the right-hand to the left-hand portion of the vat.

As shown in Fig. 9 the vertical flanges of the respective angle shaped members 41 are provided with series of openings 54 for receiving stops 55, one at each side of the tray member 28, for limiting the number of doughnuts that may float over the tray and which thus may be turned from the right-hand portion to the left-hand portion of the vat at each turn-over operation of the tray. The stop rods are made adjustable to different positions for accommodating doughnuts of different diameters.

As the doughnuts are moved from the right to the left portions of the vat by the turn-over device, they float in the grease to the left as viewed in Fig. 1 until they move over a submerged end portion of an elevating conveyor 55 which is preferably of wire mesh material. This elevating conveyor 55 is supported on transverse rolls 56 and 57 driven from any suitable power source and carries the cooked doughnuts from the vat and discharges them over a lip 58 into any suitable receptacle.

In Fig. 1 of the drawing we have shown two stop members indicated generally by numerals 59 and 60. Member 59 is located slightly to the right of the turn-over device 37 and comprises a depending flange 61 adapted, when the device is in the depressed position, to extend beneath the surface of the fat for arresting the travel of the doughnuts to the turn-over device. This stop device 59 generally is moved to the operative position described from the inoperative position shown in Fig. 1 at the beginning of a cooking operation for restraining movement of the doughnuts to the turn-over device until they have remained in the fat the proper length of time for adequate cooking. At that time the device 59 is released either manually or automatically for movement to the inoperative position shown. The arresting of the forward movements of the doughnuts by the device 59 permits an adequate supply of doughnuts to be fed into the right-hand portion of the vat as shown in the drawings after which the device is released to the inoperative position as stated. The rate of operation of the turn-over device is such as to invert the doughnuts at the rate at which they are properly cooked in the right-hand portion of the vat. The arresting device 60 performs the same function in the left-hand portion of the vat. By keeping the two portions of the vat substantially loaded with doughnuts and of course maintaining the cooking fat at the proper temperature the doughnuts will be uniformly cooked on both sides.

The improved vat structure not only is adapted for inducing a surface current for carrying the doughnuts from the entrance end to the outlet end, but by reason of the tunnel provided by the member 15 a countercurrent of grease can be provided within the vat without the use of ducts on the exterior of the vat. Heat losses and cleansing problems thus are reduced.

The imperforate top member 16 of the tunnel structure also serves another useful purpose in that dusting flour and crumbs that drop from the doughnuts or other articles being cooked lodge upon the member 16 and are thus prevented from settling upon the hot bottom of the vat where, upon scorching or charring, they would contaminate the grease.

While we have shown and described one form of our doughnut cooking apparatus, it will be understood that various changes and details in the structure may be resorted to without departure from the spirit of the invention defined by the appendant claim.

We claim:

Apparatus for transferring uncooked bakery articles such as doughnuts from trays comprising a driven endless carrier means for the trays the upper run of which is inclined in the direction of travel thereof, an endless driven conveyor belt having the upper run disposed at an obtuse angle with respect to the upper run of the carrier means and moving in a direction away from the carrier means, a member around which the lower end of the conveyor belt passes, said member being shaped and located for causing the upper and lower runs of the belt to form an acute angle with the apex thereof disposed closely adjacent the plane of the upper surface of a tray moving on said carrier means whereby the apex of the belt engages the advancing ends of the articles on the tray and effects transfer of the same to the conveyor belt as the tray moves beneath said apex, and means for engaging the advancing end portion of a tray as the same moves beyond said apex of the belt for retaining the tray against gravitational displacement from the plane of the upper run of the carrier means as the rear portion of the tray moves under said apex.

JOSEPH KINZELMAN.
FRANK A. ANETSBERGER.

References Cited in the file of this patent

UNITED STATES PATENTS

| Number | Name | Date |
|---|---|---|
| 1,440,663 | Dunn | Jan. 2, 1923 |
| 1,644,516 | Ehrhart | Oct. 4, 1927 |
| 1,854,551 | Kronborg et al. | Apr. 19, 1932 |
| 1,945,886 | Denboer | Feb. 6, 1934 |
| 2,090,598 | Parsons | Aug. 17, 1937 |